No. 776,076. Patented November 29, 1904.

UNITED STATES PATENT OFFICE.

LUDWIG MACK, OF STUTTGART, GERMANY.

MANUFACTURE OF COMPOSITIONS FROM CALCINED GYPSUM.

SPECIFICATION forming part of Letters Patent No. 776,076, dated November 29, 1904.

Application filed June 22, 1903. Serial No. 162,660. (No specimens.)

*To all whom it may concern:*

Be it known that I, LUDWIG MACK, a subject of the Emperor of Germany, residing at 17ª Herdweg, Stuttgart, in the German Empire, have invented a new and useful Manufacture of a Composition from Calcined Gypsum; and I do hereby declare that the following is a full, clear, and exact description of the invention, which will enable others skilled in the art to which it appertains to make and use the same.

This invention relates to the manufacture of a composition from calcined gypsum and sulfur, resin, tallow, wax, fat, oil, or like easily-fusible or liquid materials or the products of reaction of sulfur with these organic materials in a state of fine capillary division, all of which materials are insoluble in water. According to the invention the gypsum is calcined together with one or more of the above-named substances or with raw materials, such as seeds or grain, which contain the said substances.

It is not new to mix calcined gypsum with resin or resin solutions; but such a process does not give the fine state of division of the resin which is necessary for obtaining good results. This disadvantage is obviated by this invention.

In one method of carrying out the invention I advantageously make use of metal vessels provided with stirring mechanism or rotating calcining-drums, the crude gypsum being dehydrated in the ordinary way after it has been powdered and has had added to it about two per cent. of colophony in lumps. The fusing colophony is carried into the gypsum mass by the water-vapor generated in the calcination of the latter in a state of fine capillary division. It is advisable to so conduct the calcination that the internal temperature does not exceed 150° centigrade to prevent the decomposition of too much colophony. The resulting material is a porous gypsum-mortar characterized by extreme lightness. The water of crystallization yielded by the heating of the gypsum, and which of itself suffices to cause an effervescence of the mass, has its action increased by the fusible substances insoluble in water, which are added before the burning. The materials added may be in liquid form, as in the case of oil, or may be liquified under the action of the heat.

Gypsum treated as above described or plaster made therefrom possesses the following qualities:

First. After drying it exhibits only a slight absorption capacity. Plaster objects made from it are not easily soiled, are washable, and do not require a protective coating, the last advantage being of considerable importance in the case of plastering. Should, however, a coat of oil color or varnish be applied, the consumption of material is small, owing to the above-mentioned slight absorbability of the gypsum. The coating of paint or varnish, however, adheres well to the plaster, as the binding media for oil colors and varnishes (linseed-oil, turpentine-oil, and alcohol) are also solvents for colophony.

Second. The material has a greater insulating effect against the action of cold and heat and is a bad conductor of electricity.

Third. The above remarks apply to pure gypsum; but if the gypsum, as is the case with nearly all naturally-occurring gypsum, contains carbonate of lime a small quantity of alum or aluminium sulfate is added to it during calcination or to the plaster-water in order to prevent the combination of the acids of the resin with the lime. In this way the carbonate of lime is decomposed by the aluminium sulfate, and the carbonic acid formed can be utilized for the manufacture of a porous type of plaster and for very light porous building materials.

When the gypsum is calcined with sulfur, the sulfur, which is more easily fusible than colophony, is so finely divided that it cannot be distinguished microscopically in the mass without the employment of an analyzer. Such a mass is therefore suitable for use for sprinkling grape-vines or for like plant-disinfection purposes.

The action of the material upon plant parasites can be increased by calcining the gypsum, instead of with sulfur alone, with sulfur and colophony or with sulfur, tallow, wax, fat, or oil, in which event derivatives of sulfur, resin, and fat or the like are formed which are partly more or less volatile and partly non-volatile and which are even more inimical to parasites than the free sulfur without being injurious to the growth of the plant.

Gypsum calcined with a larger percentage of sulfur, colophony, or the like can be employed as an explosive or blasting substance of low power if the mass after calcination be mixed with carbon, potassium, chlorate, or the like or if it be used as the absorbent for nitrocellulose or the like.

It will be obvious that the temperature of calcination of gypsum and sulfur need not and, in fact, should not be so high as in the case of gypsum and colophony or gypsum, sulfur, and colophony, fat, or oil.

As calcined gypsum absorbs moisture on exposure to the air, the above-described process can be carried out with already calcined gypsum by reheating it with resin, sulfur, or the like, although the result is not by any means favorable having regard to the small amount of water-vapor that is formed.

I am aware that it has been proposed to add glue to uncalcined gypsum which is then calcined; but in such case the water released from the gypsum dissolves the glue, so as to cause it to permeate the gypsum. It has also been proposed to add glue to uncalcined gypsum, in which case it is necessary to add water to dissolve the glue and mix it properly with the gypsum. In both of these cases, however, the glue is added for the purpose of increasing the binding qualities of the gypsum and the process is entirely different from my process and does not produce the porous gypsum mortar which I obtain. According to my process the material heated with the uncalcined gypsum is insoluble in water and is taken up by the pores of the spongy gypsum, but does not increase the binding qualities thereof. On the contrary, a thoroughly-porous mass is obtained which possesses a lower specific gravity than calcined gypsum and which has no higher binding capabilities, but, on the other hand, requires more time to set.

Having now particularly described and ascertained the nature of my said invention and in what manner the same is to be performed, I declare that what I claim is—

1. The herein-described process which consists in mixing raw gypsum with matter containing easily-fusible material insoluble in water and calcining the mixture at a temperature at which the decomposition of the said fusible material is substantially prevented.

2. The herein-described process which consists in mixing raw gypsum in a dry state with easily-fusible material insoluble in water in a finely-divided condition and calcining the mixture at a temperature at which the decomposition of the fusible material is substantially prevented, whereby the fusible material is combined with the gypsum mass by the action of the watery vapor generated therefrom.

3. The herein-described process which consists in mixing raw gypsum in a dry state with easily-fusible material insoluble in water and calcining the mixture at a temperature not exceeding 150° centigrade to substantially prevent the decomposition of the fusible material.

4. The herein-described process which consists in mixing gypsum with material containing oleaginous matter, and sulfur, and calcining the mixture at a temperature at which the decomposition of the added matter is substantially prevented.

5. The herein-described process which consists in mixing gypsum with vegetable matter containing oleaginous matter and sulfur, and calcining the mixture at a temperature at which the decomposition of the fusible matter is substantially prevented.

6. A plaster consisting of calcined gypsum combined with undecomposed oleaginous matter and sulfur, substantially as described.

LUDWIG MACK.

Witnesses:
WM. HAHN,
A. KNAPP.